Mar. 27, 1923.
J. McM. LOVELESS ET AL
1,449,426
WATER MOTOR
Filed Oct. 19, 1921  2 sheets-sheet 1
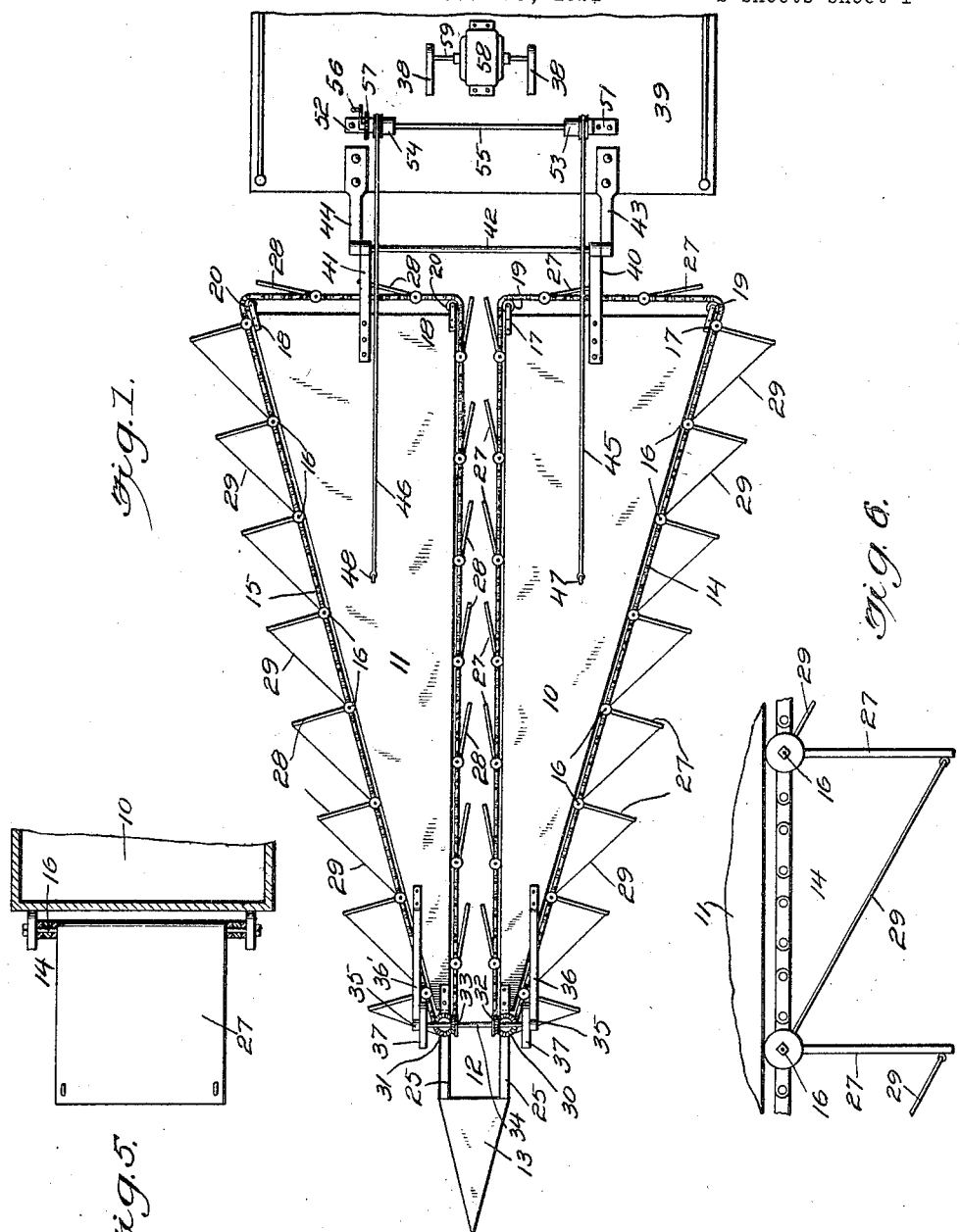

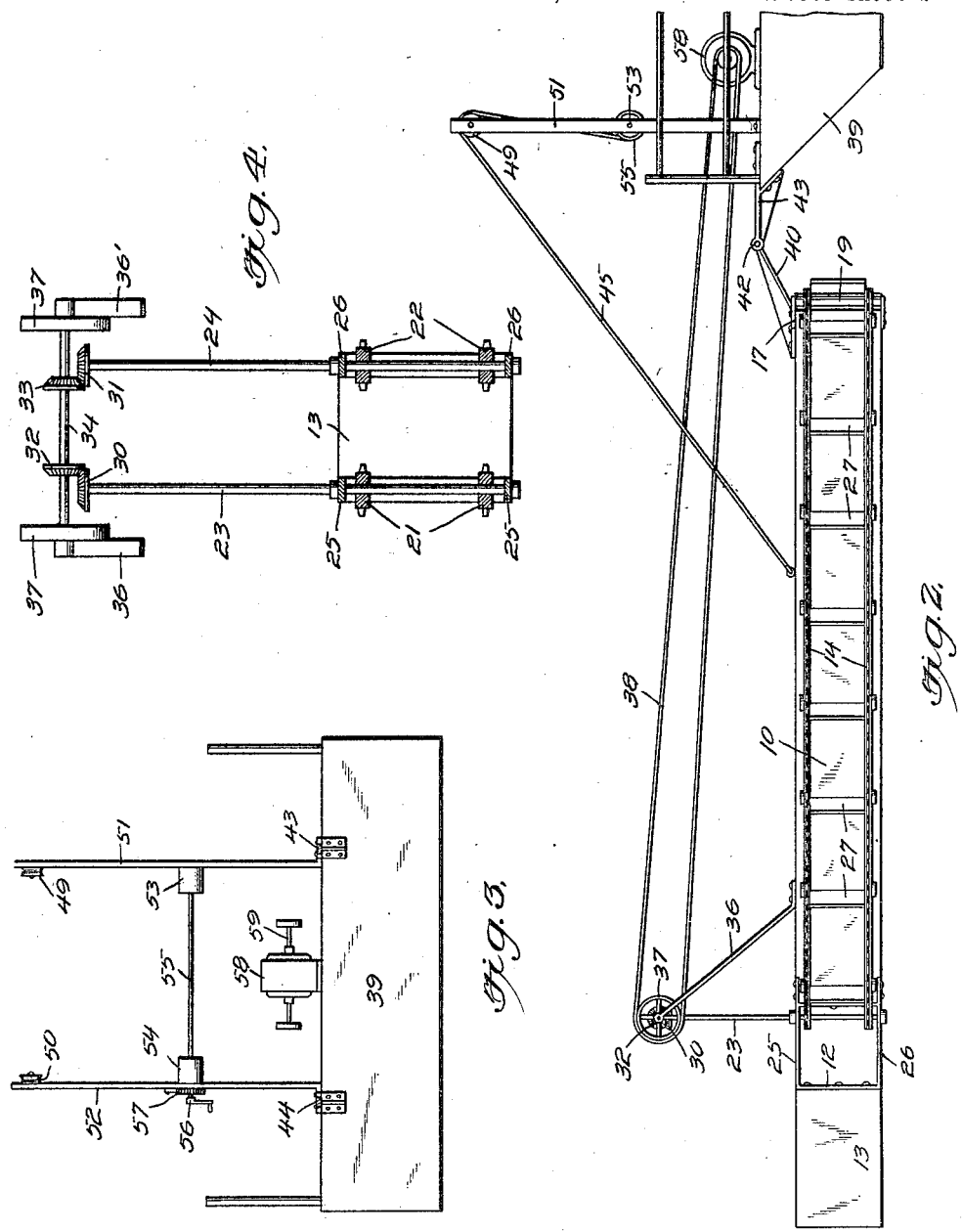

Patented Mar. 27, 1923.

1,449,426

UNITED STATES PATENT OFFICE.

JOHN McM. LOVELESS, OF PETERSBURG, AND ALVA LEVI, OF PRINCETON, INDIANA.

WATER MOTOR.

Application filed October 19, 1921. Serial No. 508,758.

*To all whom it may concern:*

Be it known that we, JOHN McM. LOVELESS and ALVA LEVI, citizens of the United States, residing at Petersburg, in the county of Pike and State of Indiana, and Princeton, in the county of Gibson, and State of Indiana, respectively, have invented certain new and useful Improvements in Water Motors, of which the following is a specification.

This invention appertains to certain improvements in water motors, and has for its principal object to provide for a type of the same adapted for the utilization of the power of the natural current or flow of streams of water and without the aid of dams or the like, or otherwise disturbing the stream from its natural state.

Another object of the invention is to provide a means for translating the power developed in the natural current or flow of streams of water into either mechanical or electrical energy for its utilization either in the immediate vicinity of the motor, or for the transmission of the same to distant points of use.

A further object of the invention is to provide for a power motor as characterized, and one involving the use of novel forms of power elements in the nature of endless belts or chains having blades or paddles arranged thereon to feather or trail in the direction of movement thereof opposed to the current or flow of water, and which automatically assumes power developing position, when moving in the same direction of the current or flow of the stream.

Another and extremely important object of the invention is to provide for a power motor of the class mentioned, and one of extremely simple, but durable and efficient construction and arrangement of the parts thereof, and which is capable of being inexpensively manufactured.

With the foregoing and other objects in view, the invention resides in the certain novel and useful construction and arrangement as will be hereinafter more fully described, set forth in the appended claims, and illustrated in the accompanying drawings, in which:—

Figure 1 is a top plan view of a preferred embodiment of the power motor, and showing the manner of its use as by being connected to a boat, barge or the like, Figure 2 is a side elevation of the power motor and of the forward end portion of a boat or barge to which the motor is connected or coupled, Figure 3 is a front end elevation of the boat or barge to which the power motor is to be connected or coupled, and showing the means for effecting the raising and lowering of the motor from and to operative position, Figure 4 is a vertical transverse section, through the rear end of the deflecting device positioned at the forward end of the motor.

Figure 5 is a fragmentary, vertical and sectional detail showing the power developing position of one of the feathering blades or paddles of the endless power elements of the motor, and Figure 6 is a fragmentary plan view of a section of one of the endless power elements of the power motor, and showing the blades or paddles thereof in operative position with respect to the current or flow of a stream of water.

Referring to the drawings, wherein similar characters of reference designate corresponding parts throughout the several views thereof, the numerals 10 and 11 indicate a pair of angularly formed hollow casings or closed frames which are arranged with their adjacent shorter sides normally parallel one to the other, and their apexes or pointed ends disposed in a common plane and coupled together through the medium of a plane member 12 extending forwardly thereof, the forward end portion 13 of the plane 12 being of an enclosed angular or pointed construction with the apex or point thereof disposed in a forward direction and in the plane of the longitudinal center of the space formed between the opposed side walls of the casings 10 and 11.

Trained around the vertical side and end walls 11 are endless parallel elements 14 and 15, respectively, each formed of a pair of sprocket chains or the like spaced apart one parallel to the other for a distance nearly equal to the width of the bent side and end walls of the casing and are held in such spaced relation by means of rods 16, the opposite corners of the rear end walls of the casings 10 and 11 having bearing brackets 17 and 18, respectively, secured at the upper and lower sides thereof for the journaling therein of vertical shafts 19 and 20, respectively, on which are mounted sprocket wheels or gears engaged by the endless chains of the power elements 14 and 15. These pairs of chains of the power elements 14 and 15 are each trained over complemental pairs of sprockets 21 and 22 carried on vertically extending shafts 23 and 24, respectively, journaled in the upper and lower members 25 and 26 of the frame 12, and at the apex or pointed ends of the casings 10 and 11.

Pivoted in equi-distantly spaced relation along each of the pairs of chains forming the endless power elements 14 and 15, and on the spaced rods 16, are a series of blades or paddles 27 and 28, respectively, and the same are arranged to feather or trail in the water, when passing along the rear end walls of the casings 10 and 11 and forwardly of the space between the opposed side walls of the latter, substantially as is shown in Figure 1, and to swing outwardly to substantially right angular relation with respect to the chains and outer side walls of the said casings 10 and 11, when moving with the current of the stream and rearwardly from the apex or pointed ends of the casings, suitable flexible elements 29, such as chains, ropes or the like, being provided to limit the outward swinging movement of the blades or paddles 27 and 28 and for retaining the same in full operative positions.

Upon the movement of the endless power elements 14 and 15, under the action of the current or flow of a stream of water, the shafts 23 and 24 are rotated and the power thereof is transmitted from the same, by means of beveled gears 30 and 31, keyed on the upper ends thereof, respectively, being arranged in mesh with complemental beveled gears 32 and 33, to a shaft 34 on which the latter beveled gears 32 and 33 are keyed for the purpose. The shaft 34 is journaled at its opposite ends in gearings 35 carried at the upper ends of a pair of vertically inclined bracket arms 36 and 36', the bracket arm 36 rising from the forward end of the casing 10 and the bracket arm 30 from the casing 11. Keyed on the opposite end portions of the shaft 34 inwardly of the bearings 35 are a pair of pulleys 37, by means of which the power of the motor may be transmitted by belt connections 38 to its point of use.

In the operation of the motor, the same is preferably coupled to a boat or barge 39, and for this purpose, the rear ends of the casings 10 and 11 are connected by a pair of arms 40 and 41, to and in hinged connection with a pair of arms 43 and 44, respectively, by means of a rod 42, the arms 43 and 44 being secured to and projecting from the adjacent end of the barge 39, for the purpose. For raising and lowering the motor from and to operative position in the water of a stream, cables, chains or the like 45 and 46 are each connected at one of their ends, the cable 45 at a suitable point, as at 47, to the casing 10, and the cable 46, as at 48, to the casing 11, and are trained over pulleys 49 and 50 carried at the upper ends of a pair of standards 51 and 52 rising from the deck of the boat or barge 39 and have their other ends secured to and wound upon a pair of drums 53 and 54, respectively, which drums are keyed on a shaft 55 journaled at its opposite ends in the standards 51 and 52, a suitable hand crank 56 being provided at one end of the shaft 55 for effecting the rotation thereof. For holding the motor in either of its raised or lowered positions, a pawl and ratchet mechanism 57 is provided, the pawl being pivoted on the standard 52 in position for cooperation with the ratchet which is keyed on the shaft 55 immediately inward of the operating crank 56.

In the use of the motor, the same together with the barge 39 is headed up-stream, so that the current or flow of the water is cut by the apex or pointed end 13 of the frame 12 at the forward end of the casings 10 and 11. In striking the end 13, the current is deflected to the opposite sides of the casings 10 and 11, and flows against the outwardly projecting blades or paddles 27 and 28, of the endless power elements 14 and 15, respectively.

In the movement of the endless power elements 14 and 15, under the action of the current of water, and around the casings 10 and 11, the blades or paddles 27 and 28 thereof will feather or trail the water as they pass to and move along the rear end walls and forwardly of the adjacent side walls of the latter, so as to offer practically no resistance to the water in their passage to the apex or forward pointed ends of these casings, at which point they will again swing outwardly into the paths of the deflected currents of the water of the stream.

For the generation of electrical current, the invention contemplates the provision of a dynamo 58, which has its armature shaft 59 provided with pulleys at its opposite ends for the training thereover of the belts 38 leading from the pulleys 37 of the drive shaft 34 of the motor. It is also contemplated for the invention, that the two casings 10 and 11 be so coupled to the frame 12 at their forward ends as to be adjusted outwardly in opposite directions one from the other and correspondingly whereby to vary the amount of power developed by the motor, such as is to be effected by the presenting of a greater or lesser area of the outer sides of the casings 10 and 11 in opposition to the direction of flow of the water of the stream. With the casings 10 and 11 positioned as shown in the several views of the drawings, i. e., the inner sides of the casings being disposed in spaced parallel relation one with respect to the other, a minimum amount of power will be developed by the motor, and by moving the rear ends of the same outwardly a greater area of the endless power elements will be presented in opposition to the flow of water of the stream, and the power of the motor correspondingly increased.

From the foregoing, it will be understood that, while a preferred embodiment of the motor has been described and illustrated in specific terms and details of the construction, arrangement and operation of the parts thereof, various changes in and modifications of the same may be resorted to without departing from the spirit of the invention, or the scope of the claims appended hereto.

Having thus fully described the invention, what is claimed, is:—

1. In a current motor, a pair of triangular shaped hollow casings having the adjacent shorter side walls thereof spaced one from and parallel to the other, endless power elements trained around the opposite vertical side and rear end walls around the apex ends of said casings, blades pivoted on said endless power elements and arranged to feather or trail the water in their movement along the rear end walls and opposed side walls of said casings and to swing to operative position when moving rearwardly of the outer vertical side walls thereof, vertical shafts carried at the apex ends of casings and engaged and operated by said elements for transmitting the power therefrom to the point of its use, and means common to and secured to the apex ends of said casings for deflecting the current of water to and along the opposite outer side walls of said casings for operation on the active blades of said endless power elements, said means having the inner portion thereof open for passage of said elements, and means connected to the other ends of said casings and cooperating with said deflecting means for maintaining the casings in spaced relation.

2. In a current motor, a pair of hollow casings opposing and spaced from each other, endless power elements trained around the walls of said casings and including feathering blades, rotatable sprockets projecting from the rear of said casings and engaging in and supporting said elements, a deflecting device secured to the front of said casing and having the inner portion thereof open for the passage of said elements, vertically disposed shafts supported by said device and provided with sprockets engaged and operated by said elements causing thereby the operation of the shafts, and means secured to the rear of the casing and cooperating with said device for maintaining the casings in spaced relation.

3. A current motor comprising a pair of triangular shaped hollow casings having the shorter side walls thereof spaced one from and parallel with the other, endless power elements traveling around the walls of said casings and including pivoted feathering blades, rotatable sprockets projecting from said casings and engaging in and supporting said elements, a deflecting device common to and secured to the apex ends of said casings for deflecting the current of water to and along the longer side walls of said casings and provided with an open inner portion for the passage of said elements, vertical shafts supported by said device and provided with sprockets engaged and operated by said elements causing thereby the operation of said shafts, and pivotally mounted means connected with the rear of the casings and cooperating with said device for maintaining the casings in spaced relation.

4. A current motor comprising a pair of triangular shaped casings having the shorter walls thereof spaced one from and parallel to the other, a triangular shaped deflecting member for deflecting the current of water to and along the longer side wall of said casings, said member having the rear portion thereof formed of two pair of arms secured to the apex ends of said casings, the arms of each pair being superposed, endless power elements traveling around the walls and apex ends of said casings and between said pair of arms, rotatable supports carried by said casings for said elements, vertical shafts supported by said arms and provided with sprockets engaged and actuated by said elements causing thereby the operation of said shafts, and means connected to the rear of said casings and cooperating with said arms for maintaining the casings in spaced relation.

In testimony whereof, we affix our signatures hereto.

JOHN McM. LOVELESS.
ALVA LEVI.